US012795293B2

(12) United States Patent
Bezzola

(10) Patent No.: US 12,795,293 B2
(45) Date of Patent: Nov. 10, 2026

(54) ACOUSTIC HORN RESONANCE ABSORBER AND DISTORTION REDUCER

(71) Applicant: Samsung Electronics Co., Ltd., Suwon-si (KR)

(72) Inventor: Andri Bezzola, La Canada, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 135 days.

(21) Appl. No.: 18/811,031

(22) Filed: Aug. 21, 2024

(65) Prior Publication Data

US 2026/0059230 A1 Feb. 26, 2026

(51) Int. Cl.
*H04R 1/28* (2006.01)
*H04R 1/30* (2006.01)

(52) U.S. Cl.
CPC ............. *H04R 1/2873* (2013.01); *H04R 1/30* (2013.01)

(58) Field of Classification Search
CPC ................................ H04R 1/2873; H04R 1/30
USPC .......................................................... 381/340
See application file for complete search history.

(56) References Cited

U.S. PATENT DOCUMENTS 5,012,890 A * 5/1991 Nagi .................... H04R 1/2826 381/353
5,351,220 A 9/1994 Noselli
11,310,587 B2 4/2022 Blore et al.
11,671,747 B2 6/2023 Li et al.
2009/0285432 A1* 11/2009 Schnitta ........... G10K 11/17861 381/353

FOREIGN PATENT DOCUMENTS

CN 219893437 U 10/2023
WO 1995-009516 A1 9/1994

OTHER PUBLICATIONS

Degraeve, S. et al., "Metamaterial Absorber for Loudspeaker Enclosures", AES 148th Convention, Online, Jun. 2-5, 2020, pp. 1-9, Audio Engineering Society, United States.
Kef Technology, Metamaterial Absorption Technology, downloaded Jul. 31, 2024 from https://us.kef.com/pages/metamaterial, 2020, United States.

* cited by examiner

*Primary Examiner* — Sean H Nguyen
(74) *Attorney, Agent, or Firm* — Sherman IP LLP; Kenneth L. Sherman; Steven Laut

(57) ABSTRACT

One embodiment provides a computer-implemented method that includes determining placement of one or more sound absorbing elements between a transducer and a loudspeaker component. Tuning parameters for the one or more sound absorbing elements are determined to absorb resonance associated with the loudspeaker component. The one or more sound absorbing elements are generated based on the tuning parameters.

20 Claims, 12 Drawing Sheets

ACOUSTIC HORN RESONANCE ABSORBER AND DISTORTION REDUCER

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to loudspeakers including sound direction components, and in particular, to loudspeakers including one or more acoustic absorbers disposed between a transducer component and a sound direction component.

BACKGROUND

Acoustic horns can be designed with many objectives. Amongst the most widely used ones are: increased efficiency, by creating a better acoustic impedance between the transducer surface and free air in the room or outdoor space; and pattern control: horns are essentially waveguides that can control the diffraction pattern of the soundwaves emanating from the transducer. The two objectives are connected because both are controlled by the horn geometry. Hence it is possible to optimize a horn for efficiency, but it can come at a cost of pattern control. One specific issue with horns that have pattern control as a primary objective is that they can have a strong resonance due to reflections from the horn mouth (wide part of horn) back to the horn throat (narrow end of the horn). These reflections can induce unwanted distortion into the sound output. While electronic equalization techniques can be used to reduce the sound output at the resonances, the equalization does not reduce the added distortion.

Typically, horns are used in loudspeaker systems in such a way that the transducer does not excite the resonance frequencies, i.e. they are high-passed to only play frequencies above the strongest/lowest horn resonance frequency, while other transducers in the loudspeaker play frequencies at and below the horn resonance. Similar issues arise when attempting to use a wide-band horn design, where the horn is designed to play content at frequencies below the horn resonance. Such systems are desirable because they can be made smaller and cheaper, utilizing fewer transducers.

SUMMARY

One embodiment provides a computer-implemented method that includes determining placement of one or more sound absorbing elements between a transducer and a sound direction component. Tuning parameters for the one or more sound absorbing elements are determined to absorb resonance associated with the sound direction component. The one or more sound absorbing elements are generated based on the tuning parameters.

Another embodiment provides a loudspeaker including a sound direction component. A transducer component is connected with the sound direction component. One or more sound absorbing elements are disposed between the sound direction component and the transducer component. The one or more sound absorbing elements are generated based on tuning parameters for the one or more sound absorbing elements that absorb resonance associated with the loudspeaker.

Still another embodiment provides an apparatus that includes a sound absorbing element configured for placement in a loudspeaker between a sound direction component and a transducer component. The sound absorbing element is generated based on tuning parameters for optimizing the sound absorbing element for absorption of resonance associated with the loudspeaker.

These and other features, aspects and advantages of the one or more embodiments will become understood with reference to the following description, appended claims and accompanying figures.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

Some embodiments relate generally to loudspeakers including sound direction components, and in particular, to loudspeakers including one or more acoustic absorbers disposed between a transducer component and a sound direction component (e.g., a horn component, a waveguide component, etc.). One embodiment provides a computer-implemented method that includes determining placement of one or more sound absorbing elements between a transducer and a loudspeaker component. Tuning parameters for the one or more sound absorbing elements are determined to absorb resonance associated with the loudspeaker component. The one or more sound absorbing elements are generated based on the tuning parameters.

Figure 1:
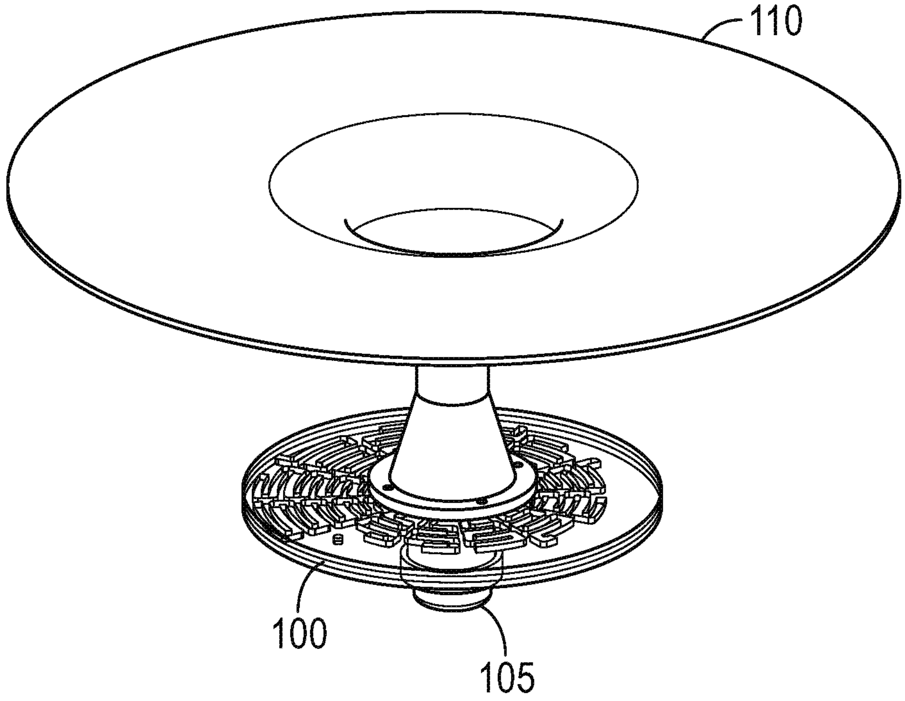
FIG. 1 is an example of an embodiment of a loudspeaker device including a sound absorbing element, according to some embodiments.

FIG. 1 is an example of an embodiment of a loudspeaker device including a sound absorbing element 100, according to some embodiments. Horn resonances occur when the impedance match from the transducer to the free air is not smooth. Impedance mismatch creates reflections that cause standing waves inside the horn, which results in a peaky frequency response of the horn. Horn resonances can also cause distortion to the sound signal in the horn. The distortions can be in the same band as the horn resonance, or they can be outside the horn resonance band. Loudspeakers often use multiple transducers for different audio bands. Woofers play the low frequencies, while midranges and tweeters play the mid and high frequencies. But the cost of using more than one transducer is significant. Full-range transducers play the entire audio band. For a full-range transducer to play at low frequencies, it needs to have a large excursion (several millimeters) compared to a midrange or a tweeter (sub-millimeter). This large excursion creates a problem when trying to outfit full-range transducers with a horn. Traditional horn loudspeakers have a narrow throat that is positioned either in front of a small transducer or they use phase plugs in front of larger diameter compression drivers. For these compression plugs to work they need to be positioned very close to the diaphragm of the transducer. Otherwise, the cavity between a diaphragm and a phase plug becomes a band-pass filter that limits the high frequency output. Furthermore, the response becomes more uneven.

One or more embodiments solve the above-mentioned problems by adding one or more acoustic absorbers integrated in the sound absorbing element 100 between the transducer 105 and the sound directing component 110 (e.g., a horn, waveguide, etc.). The acoustic absorbers are tuned to any frequency by controlling their geometry. Some embodiments determine parameters for tuning the one or more accoustic absorbers using a simulation or software application. In one or more embodiments, the accoustic absorbers are essentially ¼-wavelength absorber channels that are tuned to absorb sound energy around the sound directing component 110 resonance frequency.

In some embodiments, once the one or more accoustic absorbers are tuned, the parameters for the determined shapes (3D (dimensional) channels, resonators, etc.) on a platform (e.g., a disc, polygonal component, resonator tube, etc.) may be generated as follows. The determined shapes can be used singularly or combined to create complex forms. The determined parameters define the shape including: geometry (polygon shape (e.g., rectangle, triangle, etc.) for the base or cross-section; height (value for the shape's height); radius (value for cylindrical, spherical, etc.) shapes; and other attributes (depending on the shape type, additional parameters may include angle, curvature, aspect ratio, etc.).

Next, in some embodiments a computer-aided design (CAD) software tool may be utilized (e.g., SOLIDWORKS®, NX®, CATIA®, ProE, 3D modeling tools, etc.), to refine, adjust, create and manipulate the 3D shape. In one or more embodiments, the shape is modified as required to ensure it meets manufacturing requirements, such as tolerances, material constraints, and assembly considerations. The acquired 3D shape information is then exported and utilized in a suitable format (e.g., stereolithography (STL), OBJ, PARASOLID®, initial graphics exchange specification (IGES), STEP, etc.) for use in computer-aided manufacturing (CAM) systems, 3D printing, etc.

In some embodiments, for generating a mold for one or more accoustic absorbers, the following may be implemented. A CAD model is created where the mold geometry is designed using CAD software, including the main mold, thin mold top, and mold cap. Assembly features are utilized to position the mold components relative to each other. When meshing the mold, large edge lengths are assigned to the external boundary, while edge lengths on the internal boundary match the part edge length more closely. The mold is then determined to be generated as a CAD mold block or as regions. Creating a CAD mold block may take slightly longer, but it is recommended if the CAD model is clean and free of errors. Otherwise, generating the mold as regions and then adjusting the dimensions may be performed. The mold dimensions are verified, and adjustments are made as necessary before proceeding. Independent of the port shape optimization that can use a Finite Element Method (FEM) analysis, a mold mesh may be prepared by creating a CAD mold block around the CAD part, inserts, cooling channels, etc., and the system is fed using a tool for modeling a cuboid CAD mold or outer surface around the model. Once the mold is designed, the mold may be generated using known techniques. The generated mold can then be utilized for forming the one or more accoustic absorbers and the sound absorbing element 100.

Figure 2:
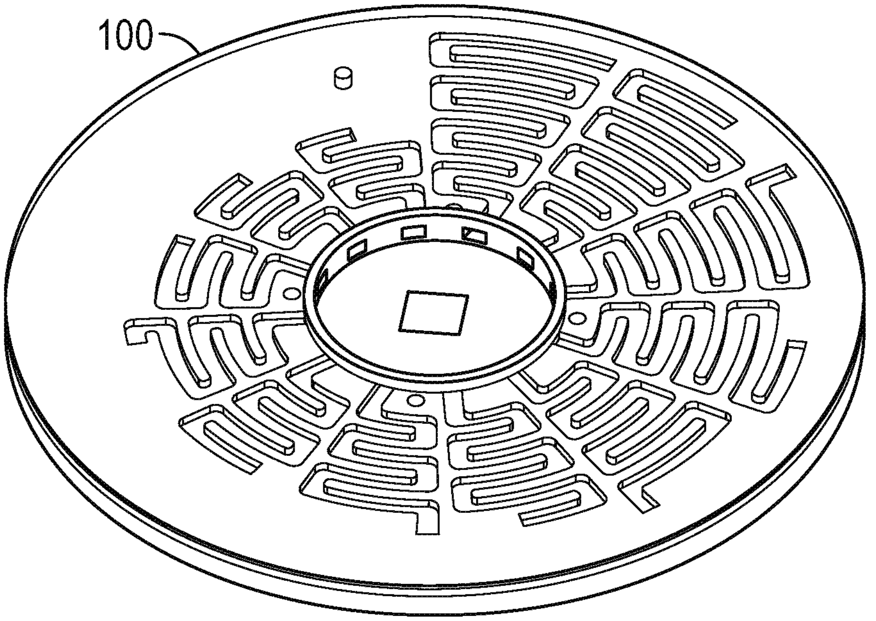
FIG. 2 illustrates an isolated view of the sound absorbing element of FIG. 1, according to some embodiments.

FIG. 2 illustrates an isolated view of the sound absorbing element 100 of FIG. 1, according to some embodiments. As shown, the example sound absorbing element 100 includes multiple accoustic absorbers (e.g., 3D channels on a 3D disc (or plate)). Other embodiments may have other shapes for the sound absorbing element 100 and the one or more accoustic absorbers.

Figure 3:
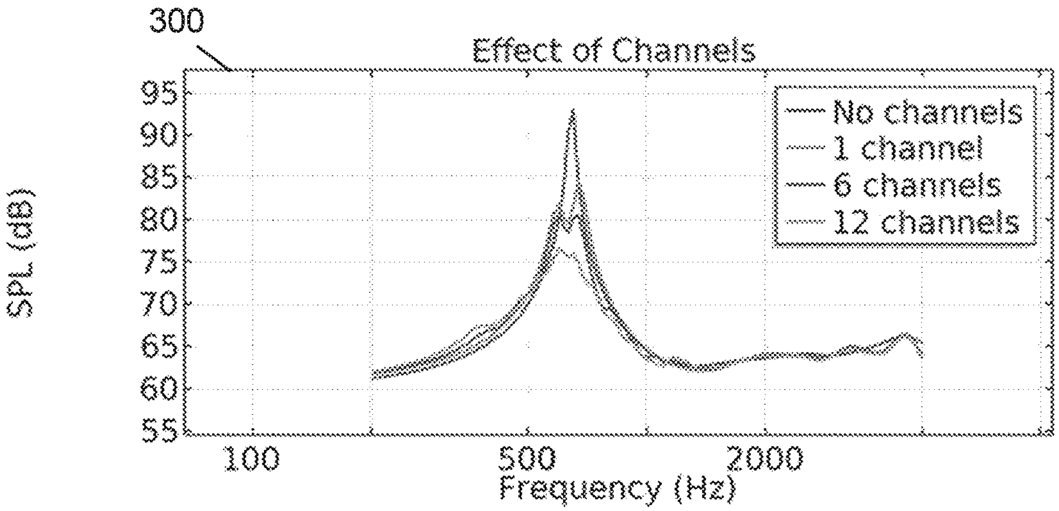
FIG. 3 illustrates an example graph showing effect of channels for a sound absorbing element, according to some embodiments.

FIG. 3 illustrates an example graph 300 showing effect of channels for a sound absorbing element 100, according to some embodiments. Individual channels absorb a narrow frequency band. To absorb a wider band of sound energy, in some embodiments multiple channels are utilized.

Figure 4:
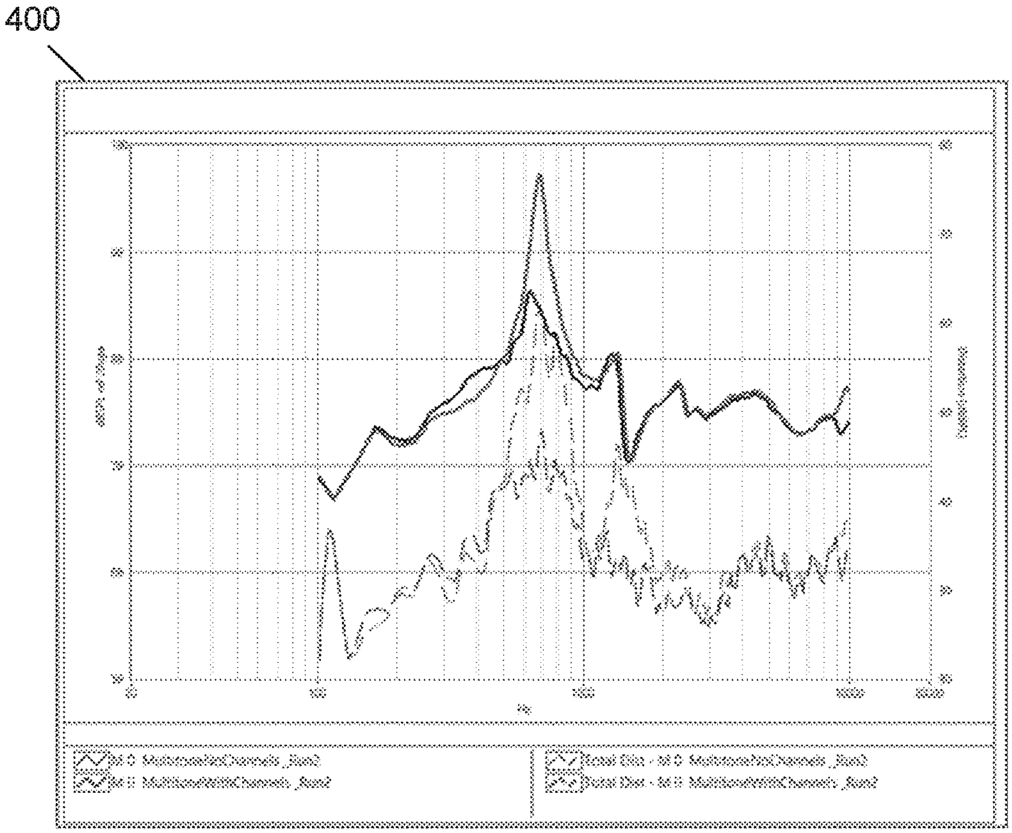
FIG. 4 illustrates an example graph showing reduction in distortion around a resonance frequency and outside horn resonance, according to some embodiments.

FIG. 4 illustrates an example graph 400 showing reduction in distortion around a resonance frequency and outside horn resonance, according to some embodiments. As shown, distortion is reduced around resonance frequency by placement of a sound absorbing element 100 with one or more accoustic absorbers between a transducer and a sound directing component. Additionally, distortion outside of horn resonance is also reduced by placement of a sound absorbing element 100 with one or more accoustic absorbers between a transducer and a sound directing component. In some cases, there are secondary and higher order resonances in the horns/waveguides, but those may be of secondary interest. It may be important to eliminate the first resonance, which is the lowest in frequency.

Figure 5A:
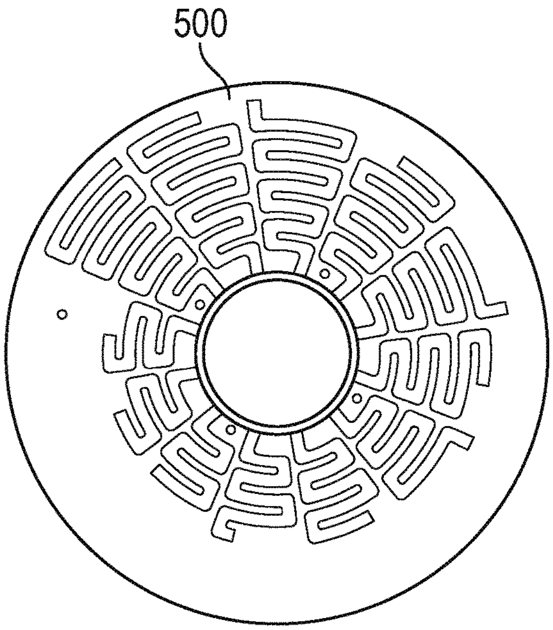
FIG. 5A illustrates an example sound absorbing element, according to some embodiments.
Figure 5B:
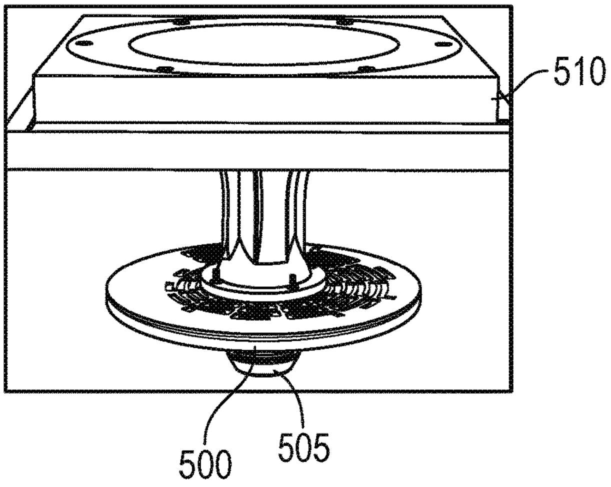
FIG. 5B illustrates an example loudspeaker including the example sound absorbing element of FIG. 5A, according to some embodiments.

FIG. 5A illustrates an example sound absorbing element 500, according to some embodiments. FIG. 5B illustrates an example loudspeaker including the example sound absorbing element 500 of FIG. 5A, according to some embodiments. As shown, the example loudspeaker includes a sound directing component 510 (horn) with the sound absorbing element 500 placed between the transducer 505 and the sound directing component 510.

Figure 6:
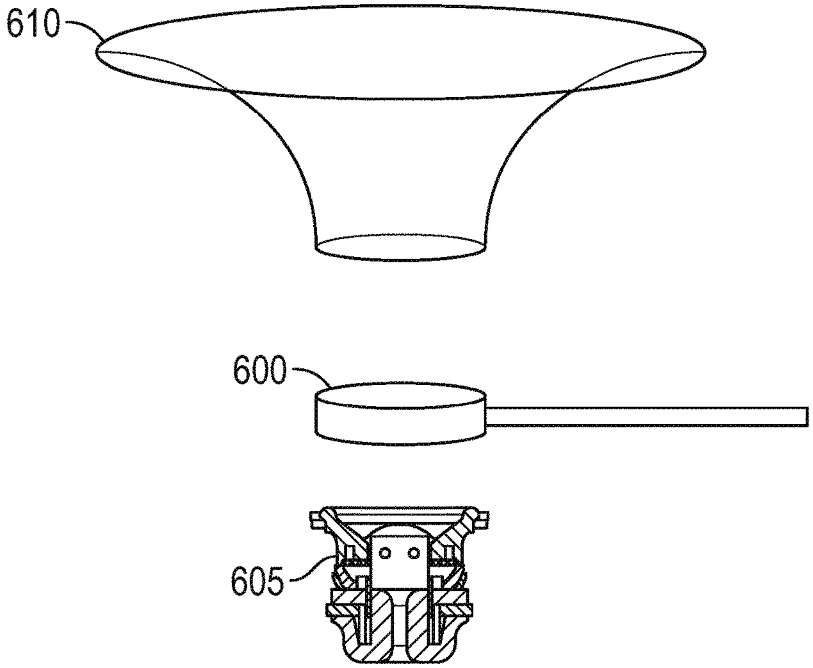
FIG. 6 illustrates an exploded view of an example loudspeaker including a sound absorbing element, according to some embodiments.

FIG. 6 illustrates an exploded view of an example loudspeaker including a sound absorbing element 600, according to some embodiments. The example loudspeaker includes an audio transducer 605, a sound directing component 610 (e.g., a horn, waveguide, etc.) and the sound absorbing element 600 mounted in front of the audio transducer 605. One or more sound absorbing elements with one or more accoustic absorbers (e.g., channels, coupled cavities, absorbing foam, etc.) placed between transducer and horn/waveguide. The one or more accoustic absorbers are tuned to absorb the sound directing component 610 resonance.

Figure 7:
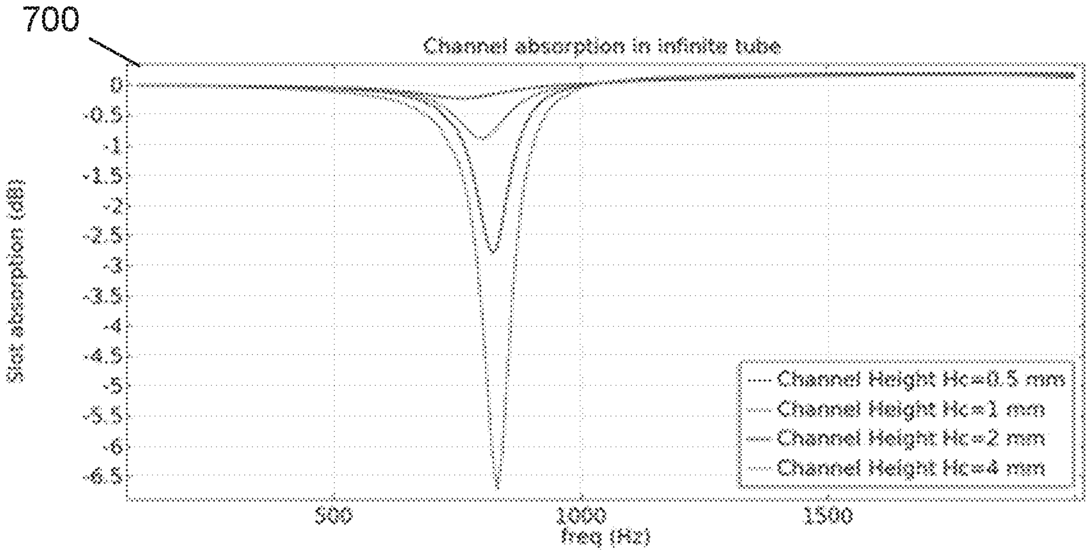
FIG. 7 illustrates a graph showing absorption for a sound absorbing channel in an infinite tube, according to some embodiments.

FIG. 7 illustrates a graph 700 showing absorption for a sound absorbing channel 810 (FIG. 8) in an infinite tube 800 (FIG. 8), according to some embodiments. In one or more embodiments, the channels are ¼ wavelength absorbers. A channel of length L absorbs frequencies at/near $$f = \frac{c}{4L},$$

where c is speed of sound in air (343 m/s). In one example, a channel of length 0.25 m absorbs sound at frequencies around 343 Hz. In some embodiments, the channels can be straight, coiled, arbitrarily folded in 3D space, etc. In some embodiments, cross sectional area of the channels control damping to some degree. Narrow channels (<2 mm) increase damping due to the fact that viscous losses in the boundary layer become significant. In one or more embodiments, channels can be filled with damping material to increase damping, lower the Q-factor of the absorbing element. It should be noted that increased damping comes at a loss of pure absorption efficiency.

Figure 8:
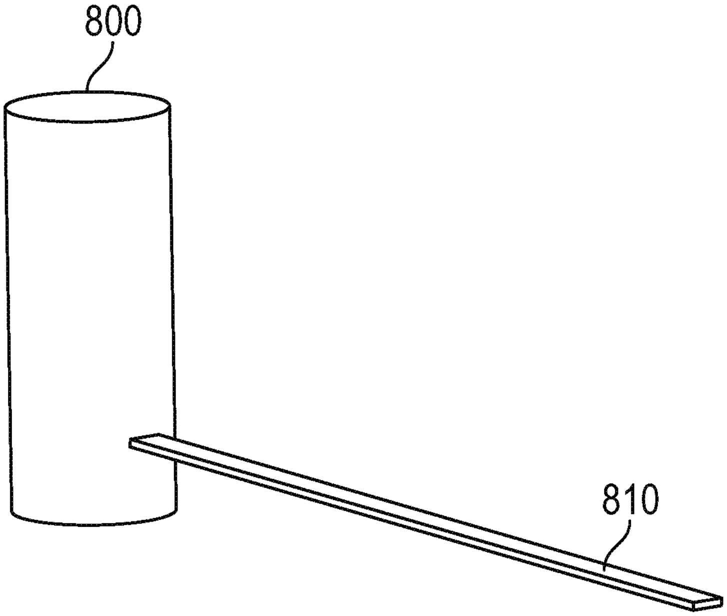
FIG. 8 illustrates an infinite cylinder and sound absorbing channel, according to some embodiments.

FIG. 8 illustrates an infinite cylinder 800 and sound absorbing channel 810, according to some embodiments. In one example embodiment, the infinite cylinder has a 2 cm outer diameter (OD), and the sound absorbing channel 810 has a length=10 cm, width 4 mm, and variable height.

Figure 9:
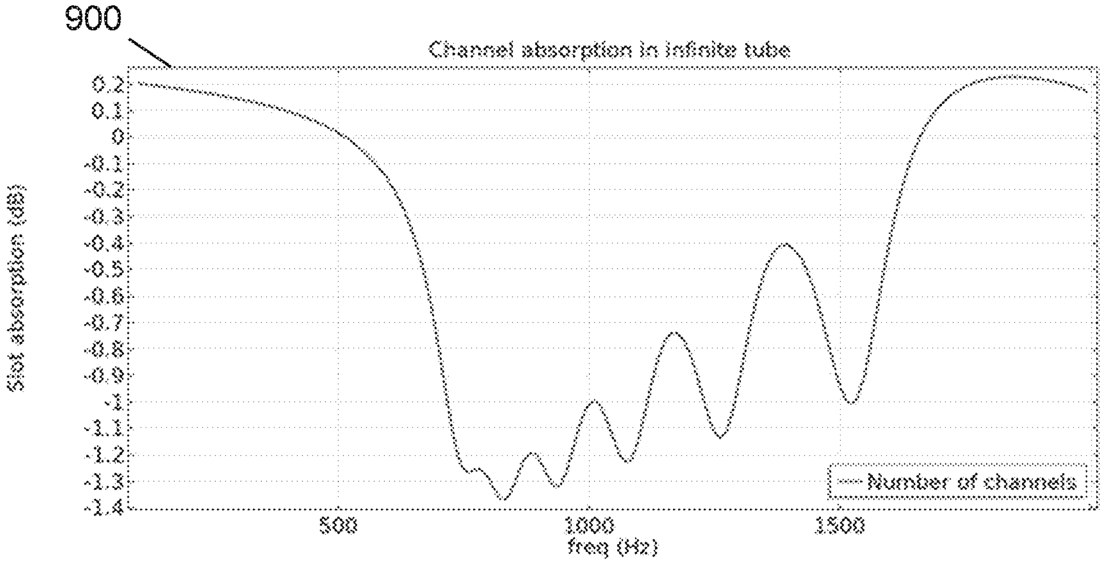
FIG. 9 illustrates a graph showing channel absorption for multiple sound absorbing channels in an infinite cylinder, according to some embodiments.
Figure 10:
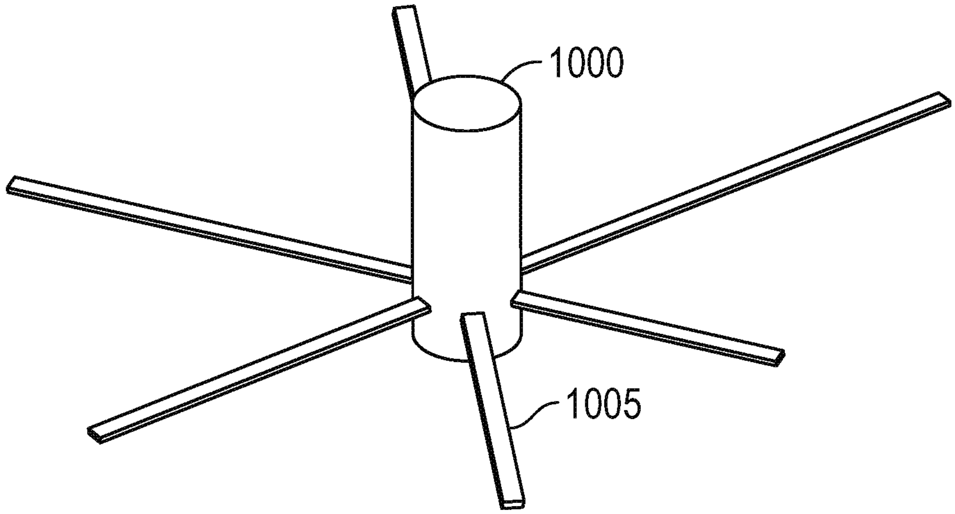
FIG. 10 illustrates an infinite cylinder and multiple sound absorbing channels, according to some embodiments.

FIG. 9 illustrates a graph 900 showing channel absorption for multiple sound absorbing channels 1005 (FIG. 10) in an infinite cylinder 1000 (FIG. 10), according to some embodiments. FIG. 10 illustrates an infinite cylinder 1000 and the multiple sound absorbing channels 1005, according to some embodiments. In some embodiments, the absorbing channels 1005 are ¼ wavelength absorbers. The channel of length L absorbs frequencies at/near $$f = \frac{c}{4L}.$$

In one or more embodiments, when more than one channel is used, their lengths can vary to absorb a larger bandwidth. As shown, there are six (6) linearly spaced sound absorbing channels 1005 between 53.5 mm (f=1600 Hz) and 107.2 mm (f=800 Hz).

Figure 11:
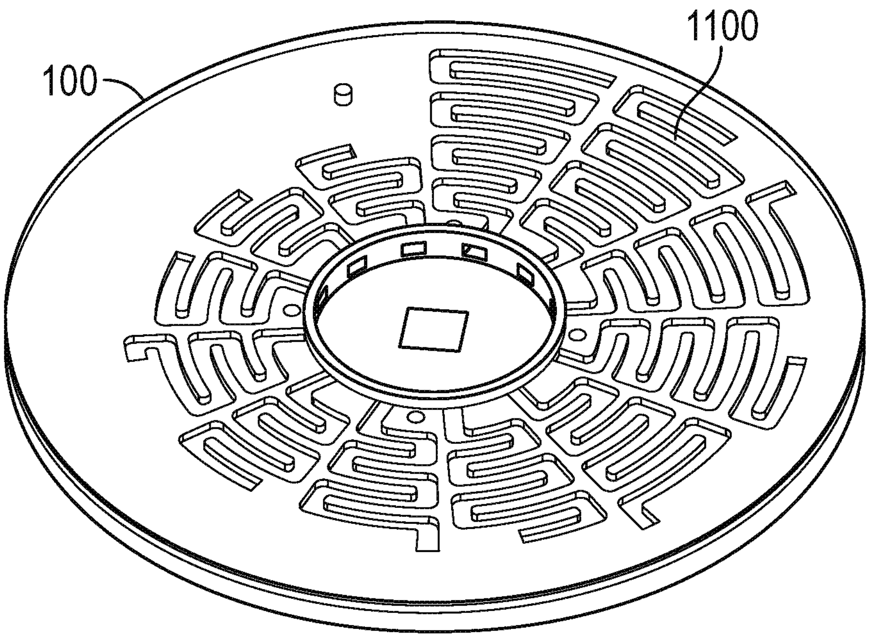
FIG. 11 illustrates an example of a sound absorbing element with an example arrangement of folded channels, according to some embodiments.

FIG. 11 illustrates the example sound absorbing element 100 with an example arrangement of folded channels 1100, according to some embodiments. In one or more embodiments, the sound absorbing channels 1100 can be arranged and folded into different configurations to fit design and manufacturing needs. The folded channels 1100 are folded in a plane and are easy to manufacture using molds, casts, etc.

Figure 12:
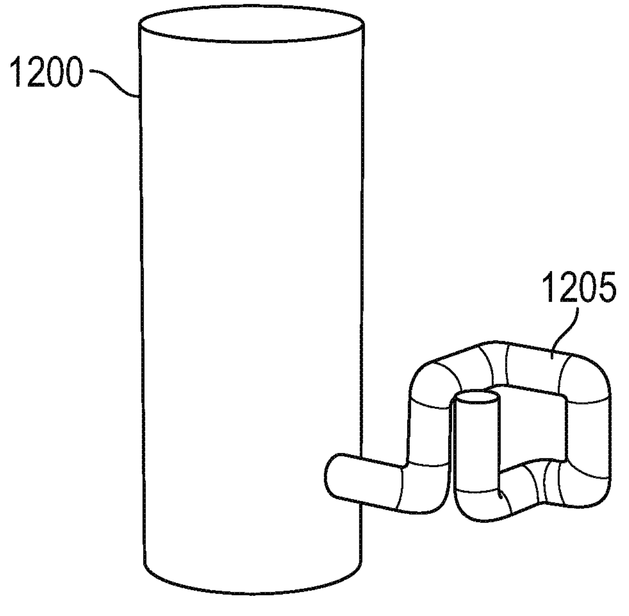
FIG. 12 illustrates an example infinite cylinder and sound absorbing element with a coiled sound absorbing channel in 3-dimensional (3D) space, according to some embodiments.

FIG. 12 illustrates an example infinite cylinder 1200 and sound absorbing element with a coiled sound absorbing channel 1205 in 3D space, according to some embodiments. In one or more embodiments, channels can be arbitrarily coiled in 3D space to fit design and manufacturing needs. The sound absorbing channels can have arbitrary cross section shape (e.g., circular, rectangular, triangular, etc.).

Figure 13:
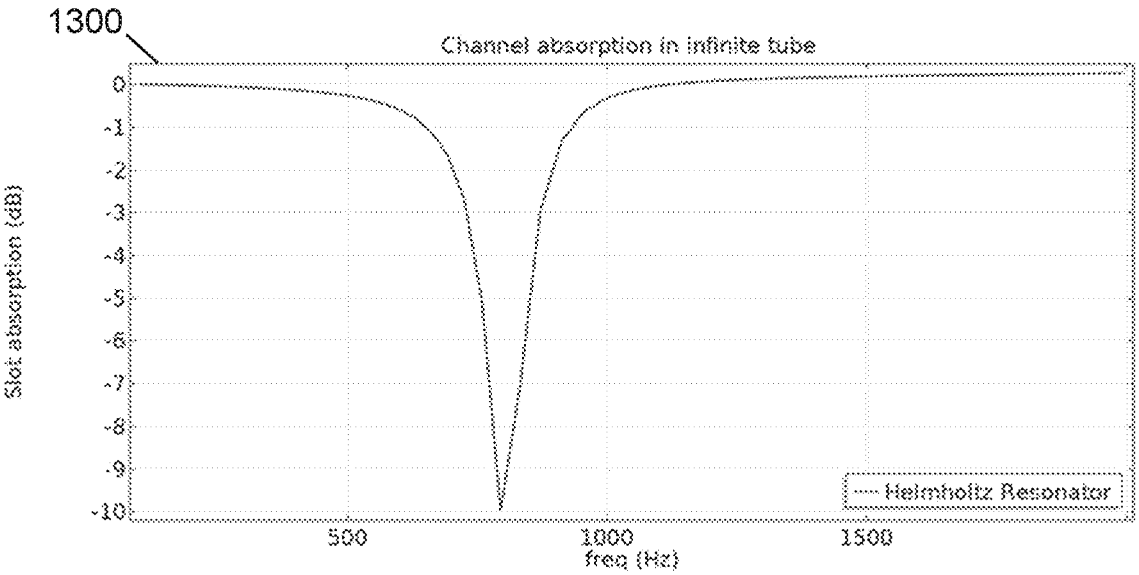
FIG. 13 illustrates a graph showing sound absorbing channel absorption for a resonator (or coupled cavities) and an infinite cylinder, according to some embodiments.

FIG. 13 illustrates a graph 1300 showing sound absorbing channel absorption for a resonator 1405 (or coupled cavities) (FIG. 14) and an infinite cylinder 1400 (FIG. 14), according to some embodiments. In one or more embodiments, coupled cavities/Helmholtz resonators absorb frequencies at/near $$f = \frac{c}{2\pi}\sqrt{\frac{A}{V_0 L_{eq}}},$$

where c is the speed of sound in air (343 m/s), A is the neck cross sectional area, $V_0$ is the volume of the coupled cavity and $L_{eq}$ is the length of the neck.

Figure 14:
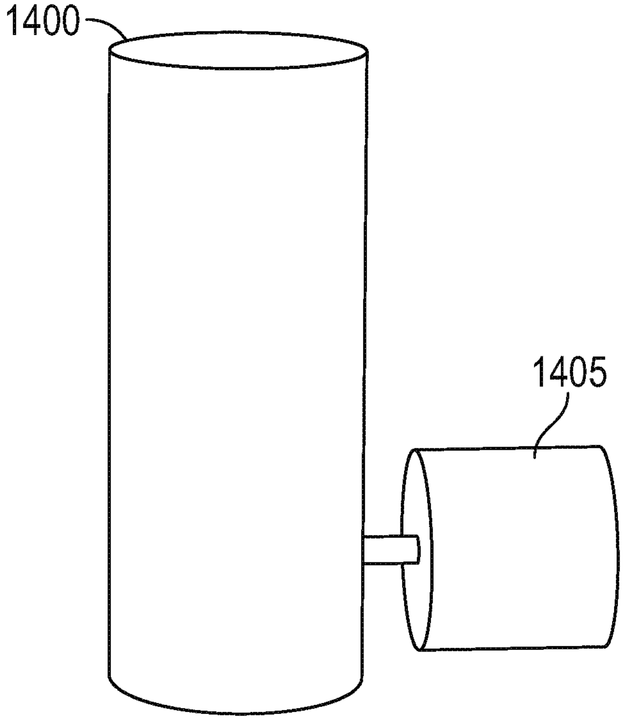
FIG. 14 illustrates an infinite cylinder and a resonator (or coupled cavities), according to some embodiments.

FIG. 14 illustrates the infinite cylinder 1400 and a resonator (or coupled cavities) 1405, according to some embodiments. In one or more embodiments, for coupled cavities/Helmholtz resonators, neck and volume can have arbitrary shape (spherical, cylindrical, cuboid, etc.). The cross sectional area of the neck must be smaller than the cross sectional area of volume. In some embodiments, resonators can be arranged around the sound direction component (e.g., horn, waveguide, etc.) throat with sound absorbing channels. Different tunings of resonators can be used to increase the absorption bandwidth.

Some embodiments can be implemented anywhere that the sound directional component (horn, waveguide, etc.) is restricting the bandwidth due to strong reflections causing resonances. Such cases are found in professional audio (Pro audio) mid and high frequency speakers, public address (PA) systems, High sound pressure level (SPL) systems that employ horns or waveguides to either increase efficiency or provide pattern control of the outgoing sound waves, speakers where pattern control is limited because pattern control and horn resonance had to compromise, etc. In one or more embodiments, a wall mounted or corner mounted loudspeaker can be designed with a corresponding shaped sound absorbing element (e.g., triangular, polygonal, etc.) with one or more acoustic absorbers that combat a strong sound absorbing element resonance. In one or more embodiments, a folded horn allows the source to be placed very close to a corner or wall, resulting in extremely even horizontal coverage in a room.

Some embodiments provide a wider useable bandwidth for a horn/waveguide speaker, which could result in systems with fewer transducers. This results in lower cost and weight of a loudspeaker system.

Figure 15:
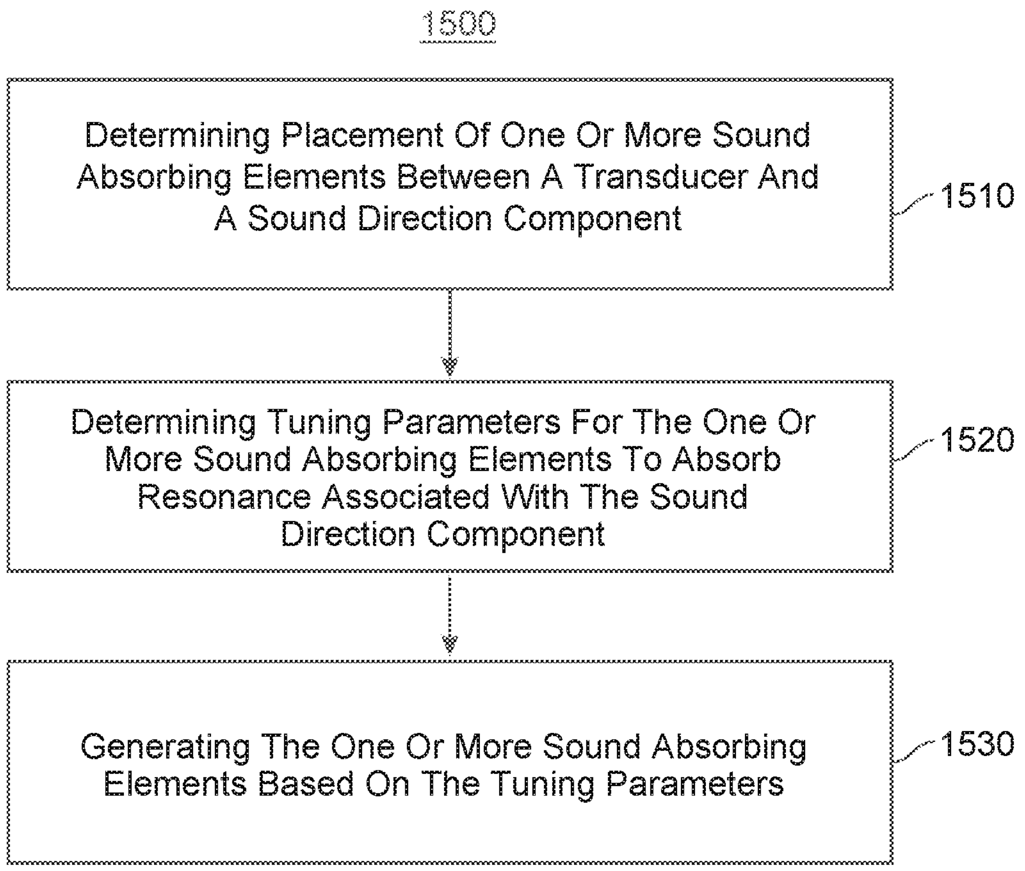
FIG. 15 illustrates a process for determining tuning parameters for one or more sound absorbing elements, according to some embodiments.

FIG. 15 illustrates a process 1500 for determining tuning parameters for one or more sound absorbing elements, according to some embodiments. In block 1510, process 1500 determines placement of one or more sound absorbing elements (e.g., sound absorbing element 100 (FIGS. 1, 2, 11), sound absorbing element 500 (FIGS. 5A-B), 610 (FIG. 6)) between a transducer (e.g., transducer 105 (FIG. 1), transducer 505 (FIG. 5B), transducer 605 (FIG. 6)) and a sound direction component (e.g., sound direction component 110 (FIG. 1), sound direction component 510 (FIG. 5B), sound direction component 610 (FIG. 6)). In block 1520, process 1500 determines tuning parameters for the one or more sound absorbing elements to absorb resonance associated with the sound direction component (e.g., utilizing a simulation, software application, etc.). In block 1530, process 1500 provides generating the one or more sound absorbing elements based on the tuning parameters (e.g., using CAD, CAM, 3D printing, a mold wizard application used for manufacturing molds, etc.).

In some embodiments, process 1500 further includes the feature that the sound direction component is a horn or a waveguide.

In one or more embodiments, process 1500 additionally includes the feature that the one or more sound absorbing elements are one or more channels, coupled cavities, or absorbing foam components.

In some embodiments, process 1500 further includes the feature that the tuning parameters determine a shape (or dimensions) of the one or more channels.

In one or more embodiments, process 1500 additionally includes the feature that the tuning parameters determine a cross sectional area of the one or more accoustic absorbing channels for controlling damping.

In some embodiments, process 1500 further includes the feature that the one or more channels are filled with damping material to increase damping or lower a quality (Q) factor.

In one or more embodiments, process 1500 additionally includes the feature that the tuning parameters determine neck and volume shape of the one or more coupled cavity resonators.

In some embodiments, process 1500 further includes the features that the tuning parameters determine placement of one or more resonators arranged around a throat of the horn, and different tuning parameters are determined to control absorption across one or more frequencies.

Figure 16:
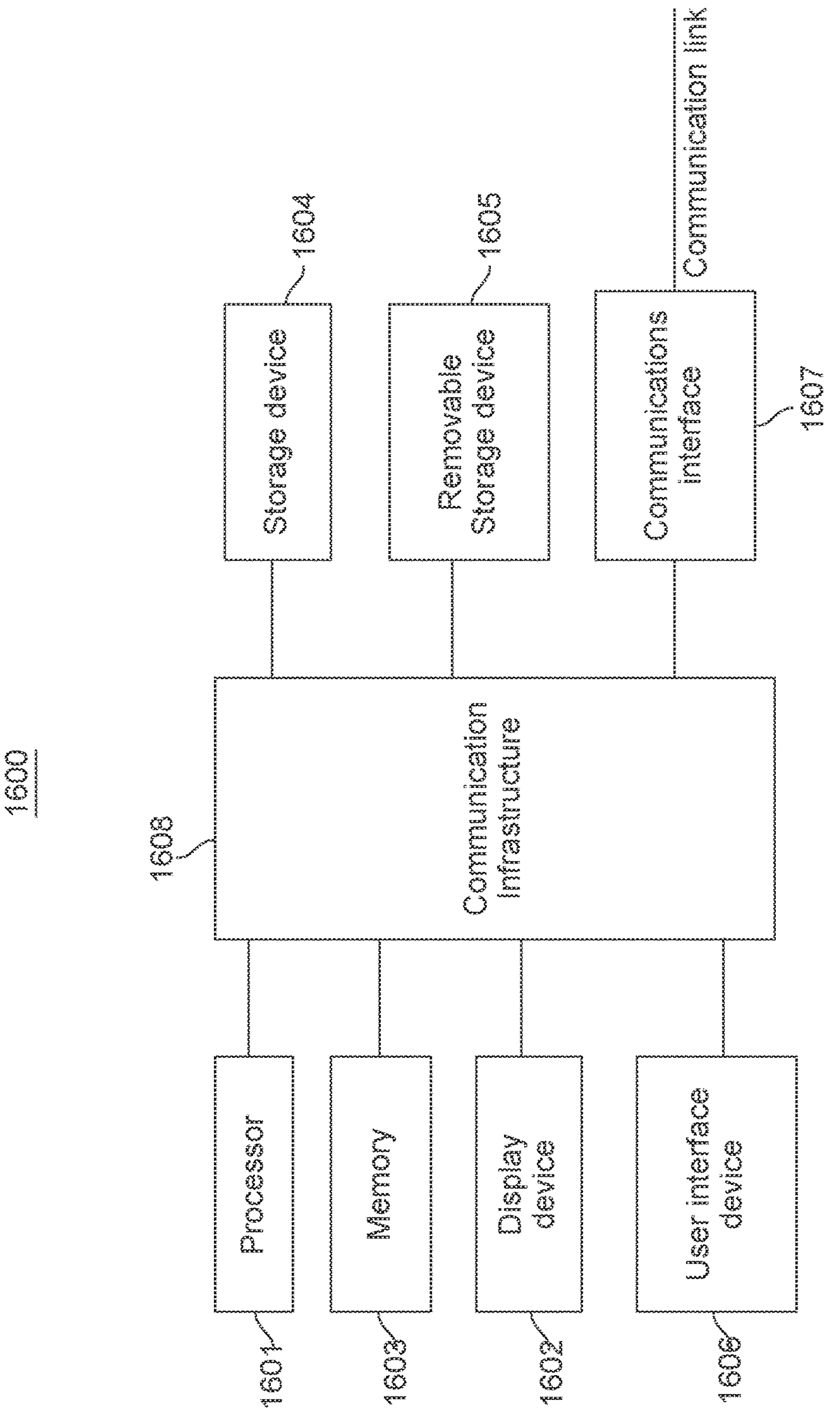
FIG. 16 illustrates a high-level block diagram showing an information processing system comprising a computer system useful for implementing one or more disclosed embodiments.

FIG. 16 illustrates a high-level block diagram showing an information processing system comprising a computer system 1600 useful for implementing the disclosed embodiments. Computer system 1600 may be incorporated in an electronic device, such as a television, a sound bar, headphones, earbuds, tablet device, etc. The computer system 1600 includes one or more processors 1601, and can further include an electronic display device 1602 (for displaying video, graphics, text, and other data), a main memory 1603 (e.g., random access memory (RAM)), storage device 1604 (e.g., hard disk drive), removable storage device 1605 (e.g., removable storage drive, removable memory module, a magnetic tape drive, optical disk drive, computer readable medium having stored therein computer software and/or data), user interface device 1606 (e.g., keyboard, touch screen, keypad, pointing device), and a communication interface 1607 (e.g., modem, a network interface (such as an Ethernet card), a communications port, or a Personal Computer Memory Card International Association (PCMCIA) slot and card). The communication interface 1607 allows software and data to be transferred between the computer system and external devices. The system 1600 further includes a communications infrastructure 1608 (e.g., a communications bus, cross-over bar, or network) to which the aforementioned devices/modules 1601 through 1607 are connected.

Information transferred via communications interface 1607 may be in the form of signals such as electronic, electromagnetic, optical, or other signals capable of being received by communications interface 1607, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

In some embodiments, processing instructions for process 1500 (FIG. 15) may be stored as program instructions on the memory 1603, storage device 1604 and the removable storage device 1605 for execution by the processor 1601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A computer-implemented method, comprising:

determining placement of one or more sound absorbing elements between a transducer and a sound direction component;

determining tuning parameters for the one or more sound absorbing elements to absorb resonance associated with the sound direction component, wherein the one or more sound absorbing elements comprise one or more acoustic channels each having a length corresponding to a target absorption frequency based on a wavelength relationship; and generating the one or more sound absorbing elements based on the tuning parameters.

2. The method of claim 1, wherein the sound direction component comprises a horn or a waveguide.

3. The method of claim 2, wherein the tuning parameters determine placement of one or more resonators arranged around a throat of the horn, and different tuning parameters are determined to control absorption across one or more frequencies.

4. The method of claim 1, wherein the one or more sound absorbing elements further comprise coupled cavities, or absorbing foam components.

5. The method of claim 4, wherein the tuning parameters determine a shape of the one or more channels.

6. The method of claim 5, wherein the one or more channels are filled with damping material to increase damping or lower a quality (Q) factor.

7. The method of claim 4, wherein the tuning parameters determine a cross sectional area of the one or more acoustic channels for controlling damping, and the cross sectional area is selected to control viscous losses within the one or more acoustic channels.

8. The method of claim 4, wherein the tuning parameters determine neck and volume shape of the one or more acoustic channels.

9. A loudspeaker comprising:

a sound direction component;

a transducer component coupled with the sound direction component; and one or more sound absorbing elements disposed between the sound direction component and the transducer component, wherein the one or more sound absorbing elements comprise one or more acoustic channels each having a length corresponding to a target absorption frequency based on a wavelength relationship;

wherein the one or more sound absorbing elements are generated based on tuning parameters for the one or more sound absorbing elements that absorb resonance associated with the loudspeaker.

10. The loudspeaker of claim 9, wherein the sound direction component comprises a horn or a waveguide.

11. The loudspeaker of claim 10, wherein:

the tuning parameters determine: neck and volume shape for the one or more acoustic channels, and placement of one or more resonators arranged around a throat of the horn component; and different tuning parameters control absorption across one or more frequencies.

12. The loudspeaker of claim 9, wherein the one or more sound absorbing elements further comprise coupled cavities, or absorbing foam components.

13. The loudspeaker of claim 12, wherein the tuning parameters for the one or more acoustic channels determine a cross sectional area of the one or more channels for controlling damping for the loudspeaker.

14. The loudspeaker of claim 12, wherein the tuning parameters for the one or more acoustic channels determine a shape of the one or more channels, and the cross sectional area is selected to control viscous losses within the one or more channels.

15. The loudspeaker of claim 14, wherein the one or more channels are filled with damping material to increase damping or lower a quality (Q) factor for the loudspeaker.

16. An apparatus comprising:

a sound absorbing element configured for placement in a loudspeaker between a sound direction component and a transducer component;

wherein the sound absorbing element comprises one or more acoustic channels each having a length corresponding to a target absorption frequency based on a wavelength relationship, and the sound absorbing element is generated based on tuning parameters for optimizing the sound absorbing element for absorption of resonance associated with the loudspeaker.

17. The apparatus of claim 16, wherein the sound direction component comprises a horn component or a waveguide.

18. The apparatus of claim 17, wherein the sound absorbing element further comprises coupled cavities, or absorbing foam components, and the tuning parameters are used for the one or more acoustic channels and determine a shape of the one or more channels.

19. The apparatus of claim 17, wherein the tuning parameters determine a cross sectional area of the one or more acoustic channels for controlling damping for the loudspeaker.

20. The apparatus of claim 17, wherein:

the one or more acoustic channels are filled with damping material to increase damping or lower a quality (Q) factor for the loudspeaker;

the tuning parameters determine placement of one or more resonators arranged around a throat of the horn component; and different tuning parameters control absorption across one or more frequencies.

* * * * *